United States Patent
Karlsson

(10) Patent No.: US 11,034,316 B2
(45) Date of Patent: Jun. 15, 2021

(54) MOUNTING ARRANGEMENT FOR COUPLING A BUMPER BEAM TO A CRASH BOX AND SIDE RAIL OF A VEHICLE

(71) Applicant: Volvo Car Corporation, Gothenburg (SE)

(72) Inventor: Daniel Karlsson, Ytterby (SE)

(73) Assignee: Volvo Car Corporation, Gothenburg (SE)

( * ) Notice: Subject to any disclaimer, the term of this patent is extended or adjusted under 35 U.S.C. 154(b) by 124 days.

(21) Appl. No.: 16/548,922

(22) Filed: Aug. 23, 2019

(65) Prior Publication Data

US 2021/0053519 A1   Feb. 25, 2021

(51) Int. Cl.
*B60R 19/34* (2006.01)
*B60R 19/24* (2006.01)
*B60R 19/02* (2006.01)

(52) U.S. Cl.
CPC ............ *B60R 19/34* (2013.01); *B60R 19/023* (2013.01); *B60R 19/24* (2013.01); *B60R 2019/247* (2013.01)

(58) Field of Classification Search
CPC ....... A63H 17/26; B60F 1/005; B60G 17/019; B60G 2300/26; B60G 5/047; A61M 5/14546; A61M 5/14566; B41J 11/003; B41J 11/008; B41J 11/42
See application file for complete search history.

(56) References Cited

U.S. PATENT DOCUMENTS

| 3,860,258 | A | * | 1/1975 | Feustel | ................. B60R 19/34 180/312 |
| 4,200,318 | A | * | 4/1980 | Gute | ..................... B60R 19/30 267/201 |
| 4,410,208 | A | * | 10/1983 | Mulso, Jr. | ............. B60R 19/34 180/271 |

(Continued)

FOREIGN PATENT DOCUMENTS

| DE | 102005021663 B3 | 5/2006 |
| EP | 2202118 A1 | 6/2010 |

OTHER PUBLICATIONS

Oct. 13, 2020 European Search Report issued on International Application No. 20191560.

*Primary Examiner* — Kiran B Patel
(74) *Attorney, Agent, or Firm* — Clements Bernard Walker; Christopher L. Bernard

(57) ABSTRACT

A bumper assembly for a vehicle, the bumper assembly including: a side rail; a bumper beam assembly coupled to the side rail; and a crush can assembly adapted to couple the bumper beam assembly to the side rail, the crush can assembly including: a box structure including a front portion and a rear portion, wherein the rear portion of the box structure is adapted to be coupled to the side rail; and a mounting bracket coupled to the front portion of the box structure, wherein the mounting bracket is adapted to be coupled to the bumper beam assembly. The mounting bracket includes a planar structure that is coupled to the front portion of the box structure and one or more bracket members that protrude substantially perpendicularly from the planar structure, wherein each of the one or more bracket members is adapted to be coupled to the bumper beam assembly.

18 Claims, 7 Drawing Sheets

(56) References Cited

U.S. PATENT DOCUMENTS

| | | | |
|---|---|---|---|
| 4,465,312 A * | 8/1984 | Werner | B60R 19/36 293/104 |
| 4,830,417 A * | 5/1989 | Bates | B60R 19/26 267/116 |
| 5,385,375 A * | 1/1995 | Morgan | B60R 19/18 293/109 |
| 7,793,997 B2 | 9/2010 | Karlander | |
| 8,353,545 B1 * | 1/2013 | Baldwin | B60R 19/34 293/133 |
| 8,567,854 B2 * | 10/2013 | Nishi | B60Q 1/0491 296/193.09 |
| 8,662,566 B1 * | 3/2014 | Edwards | B60R 19/24 296/187.09 |
| 8,939,480 B1 * | 1/2015 | Barbat | B60R 19/34 293/133 |
| 8,991,544 B1 * | 3/2015 | Stratten | B60R 19/16 180/274 |
| 8,991,903 B1 * | 3/2015 | Alavandi | B60R 19/26 296/187.09 |
| 9,168,883 B1 * | 10/2015 | Midoun | B62D 21/152 |
| 9,199,592 B1 | 12/2015 | Nusier et al. | |
| 9,254,800 B2 | 2/2016 | Nilsson | |
| 9,308,940 B1 * | 4/2016 | Malavalli | B62D 21/152 |
| 9,352,783 B2 * | 5/2016 | Winberg | F16F 7/12 |
| 9,415,735 B1 * | 8/2016 | Baccouche | B60R 19/34 |
| 9,598,033 B1 * | 3/2017 | Berger | B60R 19/18 |
| 9,630,582 B1 * | 4/2017 | Faruque | F16F 7/122 |
| 9,868,468 B1 * | 1/2018 | Park | B62D 25/085 |
| 10,077,077 B1 * | 9/2018 | Legray | B62D 25/08 |
| 10,632,946 B2 * | 4/2020 | Jadhav | B60R 19/18 |
| 2003/0218341 A1 * | 11/2003 | Jonsson | B60R 19/18 293/102 |
| 2004/0207217 A1 * | 10/2004 | Muller | B60D 1/488 293/133 |
| 2006/0249962 A1 | 11/2006 | Gonzalez et al. | |
| 2006/0290150 A1 * | 12/2006 | Roll | B60R 19/18 293/133 |
| 2007/0040398 A1 * | 2/2007 | Lutke-Bexten | B60R 19/18 293/102 |
| 2008/0030031 A1 * | 2/2008 | Nilsson | B60R 19/34 293/133 |
| 2008/0054655 A1 * | 3/2008 | Kizaki | B60R 19/26 293/133 |
| 2008/0224487 A1 * | 9/2008 | Wang | B60R 19/34 293/132 |
| 2009/0001737 A1 * | 1/2009 | Salomonsson | B60R 19/34 293/133 |
| 2009/0243313 A1 * | 10/2009 | Handing | B60R 19/34 293/133 |
| 2009/0261602 A1 | 10/2009 | Karlander | |
| 2010/0019518 A1 * | 1/2010 | Stewart | B60R 19/34 293/133 |
| 2010/0194125 A1 * | 8/2010 | Wibbeke | B60R 19/24 293/120 |
| 2011/0062750 A1 * | 3/2011 | Nakaura | B60R 19/12 296/187.09 |
| 2011/0121587 A1 * | 5/2011 | Handing | B60R 19/18 293/133 |
| 2011/0291431 A1 * | 12/2011 | Buschsieweke | C22C 38/32 293/133 |
| 2013/0076051 A1 * | 3/2013 | Baldwin | B60R 19/34 293/133 |
| 2014/0062106 A1 | 3/2014 | Han | |
| 2014/0203577 A1 * | 7/2014 | Nagwanshi | B60R 19/023 293/120 |
| 2015/0003904 A1 * | 1/2015 | Saje | B62D 29/008 403/361 |
| 2015/0021939 A1 * | 1/2015 | Bryer | B60R 19/34 293/132 |
| 2015/0021940 A1 * | 1/2015 | Roselli | B60R 19/34 293/133 |
| 2015/0353040 A1 * | 12/2015 | Butukuri | B60R 19/16 293/102 |
| 2015/0367796 A1 * | 12/2015 | Farooq | B60R 19/03 293/109 |
| 2017/0001586 A1 * | 1/2017 | Ashraf | B62D 21/152 |
| 2017/0088076 A1 * | 3/2017 | Fujimoto | B60R 19/04 |
| 2017/0166148 A1 * | 6/2017 | Freundl | B21C 23/14 |
| 2017/0210316 A1 * | 7/2017 | Duffe | B60R 19/04 |
| 2017/0217393 A1 * | 8/2017 | Mohapatra | F16F 7/12 |
| 2017/0274849 A1 * | 9/2017 | Jordan | B60R 19/24 |
| 2017/0274852 A1 * | 9/2017 | Jordan | B60R 19/023 |
| 2017/0305220 A1 * | 10/2017 | Virupaksha | B60R 19/03 |
| 2017/0369013 A1 * | 12/2017 | Muralidharan | B60R 19/18 |
| 2018/0037179 A1 * | 2/2018 | Steinebach | B22D 25/02 |
| 2018/0162303 A1 * | 6/2018 | Aitharaju | B60R 19/34 |
| 2018/0170294 A1 * | 6/2018 | Hashimoto | B60R 19/34 |
| 2018/0328435 A1 * | 11/2018 | Tyan | F16F 7/121 |
| 2019/0111872 A1 * | 4/2019 | Newcomb | B60R 19/34 |
| 2019/0232903 A1 * | 8/2019 | Newcomb | B60R 19/023 |

* cited by examiner

MOUNTING ARRANGEMENT FOR COUPLING A BUMPER BEAM TO A CRASH BOX AND SIDE RAIL OF A VEHICLE

TECHNICAL FIELD

The present disclosure relates generally to the automotive field. More particularly, the present disclosure relates to a mounting arrangement for coupling a bumper beam to a crash box (or crush can) and side (or longitudinal) rail of a vehicle.

BACKGROUND

Conventional front bumper systems typically consist of a pair of extruded aluminum longitudinal crush cans that absorb the energy of a front-end collision and a lateral bumper beam that connects the crush cans, to and/or around which a bumper fascia is affixed. The bumper beam is attached to a pair of longitudinal side rails of the vehicle via the intervening crush cans. The main purpose of the front bumper system is to absorb the energy from the front-end collision, especially when it is low-speed, and be a readily replaceable component subsequently. The side rails serve as the vehicle's main system for mitigating and absorbing energy in a high-speed collision, with the front bumper system assisting by compressing and absorbing as much energy as possible, while maintaining structural integrity from side-to-side during and after the collision. It is thus undesirable for the front bumper system to undergo complete collapse under any circumstances, meaning the bumper beam detaches from either of the crush cans. Such scenario could lead to runway intrusion, directly impacting passenger survival space. Further, complete front bumper system collapse provides a bad impression, sending a message that the structure is incapable of handling any more load, and is perhaps right at the limit for meeting a legal standard and/or passing a rating test. Thus, added safety margin and performance robustness is desired, including in the area of extruded aluminum front bumper systems, and, more specifically, at the crush can/bumper beam interface.

Typically, the front portion of a crush can is formed by some sort of computer-numerical control (CNC) tooling process and/or punch tooling process to provide a mounting interface for the bumper beam. Another common approach is to utilize a forming operation intended to shape the front portion of the extrusion to provide a suitable attachment interface. In both cases, this means that such crush cans are structurally compromised from the start. Weak points are created in the mounting interface, leading to stress concentration during loading conditions. A common problem experienced with respect to a crush can is crack initiation, including crack growth and micro and macro-fracture stemming from the weak points, as stresses begin to build as a natural consequence of a bumper beam transferring its loads to a crush can. Further, instead of a crush can displaying an orderly folding behavior, where the entire profile is triggered properly, the bumper beam often acts like a knife, punching right through a crush can, basically ripping it apart. This is caused by inadequate design attention and consideration related to the effect of stress concentration. This, of course leads, to diminished vehicle performance in the event of a collision, since the design utilized does not fully take advantage of the compression potential of the material(s) utilized.

An important factor in trying to use most of a profile's potential, in terms of energy absorption, is to engage it as evenly as possible along its entire interface surface or area, and to avoid local triggering points or triggering planes offset from each other, especially in a vehicle's longitudinal direction. Further, it is important to minimize crack initiation sites as much as possible. The development of cracks reveals that a critical tipping point has been reached where the material is no longer able to withstand more strain and releases excess energy in the form of cracks. Once this process has started, it is more or less a runaway scenario where load capacity drops, feeding into a cycle of more rupture. By extension, such a scenario in a high-speed collision often leads to detachment between a bumper beam and a crush can, due to global component fracturing.

Thus, many conventional bumper systems overlook the critical role that stress concentration plays and the importance of proper triggering, leading to lower performance levels than would otherwise be possible. As such, there is a need for a bumper system that maximizes occupant safety, keeps initial weight and cost neutral, and lowers replacement and insurance costs.

SUMMARY

The present disclosure pertains generally to vehicle safety and provides for the improved transmission and absorption of crash energy in a crash box (or crush can) disposed between a bumper beam and a side (or longitudinal) rail, while optimizing material utilization and achieving low process cost and weight. The present disclosure provides a crush can/bumper beam mounting interface that provides enhanced load distribution, thereby achieving better folding behavior and higher energy absorption. A second aspect of the present disclosure is to improve energy absorption and improve folding behavior by significantly reducing the risk of crack initiation (and propagation) in the crush cans via the elimination of stress concentration point and planes.

In one exemplary embodiment, the present disclosure provides a crush can assembly adapted to couple a bumper beam assembly to a side rail of a vehicle, the crush can assembly including: a box structure including a front portion and a rear portion, wherein the rear portion of the box structure is adapted to be coupled to the side rail; and a mounting bracket coupled to the front portion of the box structure, wherein the mounting bracket is adapted to be coupled to the bumper beam assembly. The rear portion of the box structure is adapted to be one or more of disposed within and bolted to the side rail. The mounting bracket is welded to a front edge of the front portion of the box structure. Optionally, the mounting bracket is welded to a side edge of the front portion of the box structure. The mounting bracket includes one or more flanges that are each welded to the side edge of the front portion of the box structure. The mounting bracket includes a planar structure that is coupled to the front portion of the box structure and one or more bracket members that protrude substantially perpendicularly from the planar structure, wherein each of the one or more bracket members is adapted to be coupled to the bumper beam assembly. Each of the one or more bracket members defines a hole adapted to receive a first bolt that is disposed through the bumper beam assembly and a slot adapted to receive a second bolt that is disposed through the bumper beam assembly. Optionally, the slot is disposed outboard of the associated hole. The first bolt is disposed through a first sleeve coupled to and through the bumper beam assembly and the second bolt is disposed through a second sleeve coupled to and through the bumper beam assembly.

In another exemplary embodiment, the present disclosure provides a bumper assembly for a vehicle, the bumper assembly including: a side rail; a bumper beam assembly coupled to the side rail; and a crush can assembly adapted to couple the bumper beam assembly to the side rail, the crush can assembly including: a box structure including a front portion and a rear portion, wherein the rear portion of the box structure is adapted to be coupled to the side rail; and a mounting bracket coupled to the front portion of the box structure, wherein the mounting bracket is adapted to be coupled to the bumper beam assembly. The rear portion of the box structure is adapted to be one or more of disposed within and bolted to the side rail. The mounting bracket is welded to a front edge of the front portion of the box structure. Optionally, the mounting bracket is welded to a side edge of the front portion of the box structure. The mounting bracket includes one or more flanges that are each welded to the side edge of the front portion of the box structure. The mounting bracket includes a planar structure that is coupled to the front portion of the box structure and one or more bracket members that protrude substantially perpendicularly from the planar structure, wherein each of the one or more bracket members is adapted to be coupled to the bumper beam assembly. Each of the one or more bracket members defines a hole adapted to receive a first bolt that is disposed through the bumper beam assembly and a slot adapted to receive a second bolt that is disposed through the bumper beam assembly. Optionally, the slot is disposed outboard of the associated hole. The first bolt is disposed through a first sleeve coupled to and through the bumper beam assembly and the second bolt is disposed through a second sleeve coupled to and through the bumper beam assembly.

In a further exemplary embodiment, the present disclosure provides a vehicle utilizing a bumper assembly including: a side rail; a bumper beam assembly coupled to the side rail; and a crush can assembly adapted to couple the bumper beam assembly to the side rail, the crush can assembly including: a box structure including a front portion and a rear portion, wherein the rear portion of the box structure is adapted to be coupled to the side rail; and a mounting bracket coupled to the front portion of the box structure, wherein the mounting bracket is adapted to be coupled to the bumper beam assembly. The rear portion of the box structure is adapted to be one or more of disposed within and bolted to the side rail. The mounting bracket is welded to a front edge of the front portion of the box structure. Optionally, the mounting bracket is welded to a side edge of the front portion of the box structure. The mounting bracket includes one or more flanges that are each welded to the side edge of the front portion of the box structure. The mounting bracket includes a planar structure that is coupled to the front portion of the box structure and one or more bracket members that protrude substantially perpendicularly from the planar structure, wherein each of the one or more bracket members is adapted to be coupled to the bumper beam assembly. Each of the one or more bracket members defines a hole adapted to receive a first bolt that is disposed through the bumper beam assembly and a slot adapted to receive a second bolt that is disposed through the bumper beam assembly. Optionally, the slot is disposed outboard of the associated hole. The first bolt is disposed through a first sleeve coupled to and through the bumper beam assembly and the second bolt is disposed through a second sleeve coupled to and through the bumper beam assembly.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, the present disclosure pertains generally to vehicle safety and provides for the improved transmission and absorption of crash energy in a crash box (or crush can) disposed between a bumper beam and a side (or longitudinal) rail, while optimizing material utilization and achieving low process cost and weight. The present disclosure provides a crush can/bumper beam mounting interface that provides enhanced load distribution, thereby achieving better folding behavior and higher energy absorption. A second aspect of the present disclosure is to improve energy absorption and improve folding behavior by significantly reducing the risk of crack initiation (and propagation) in the crush cans via the elimination of stress concentration point and planes.

Figure 1:
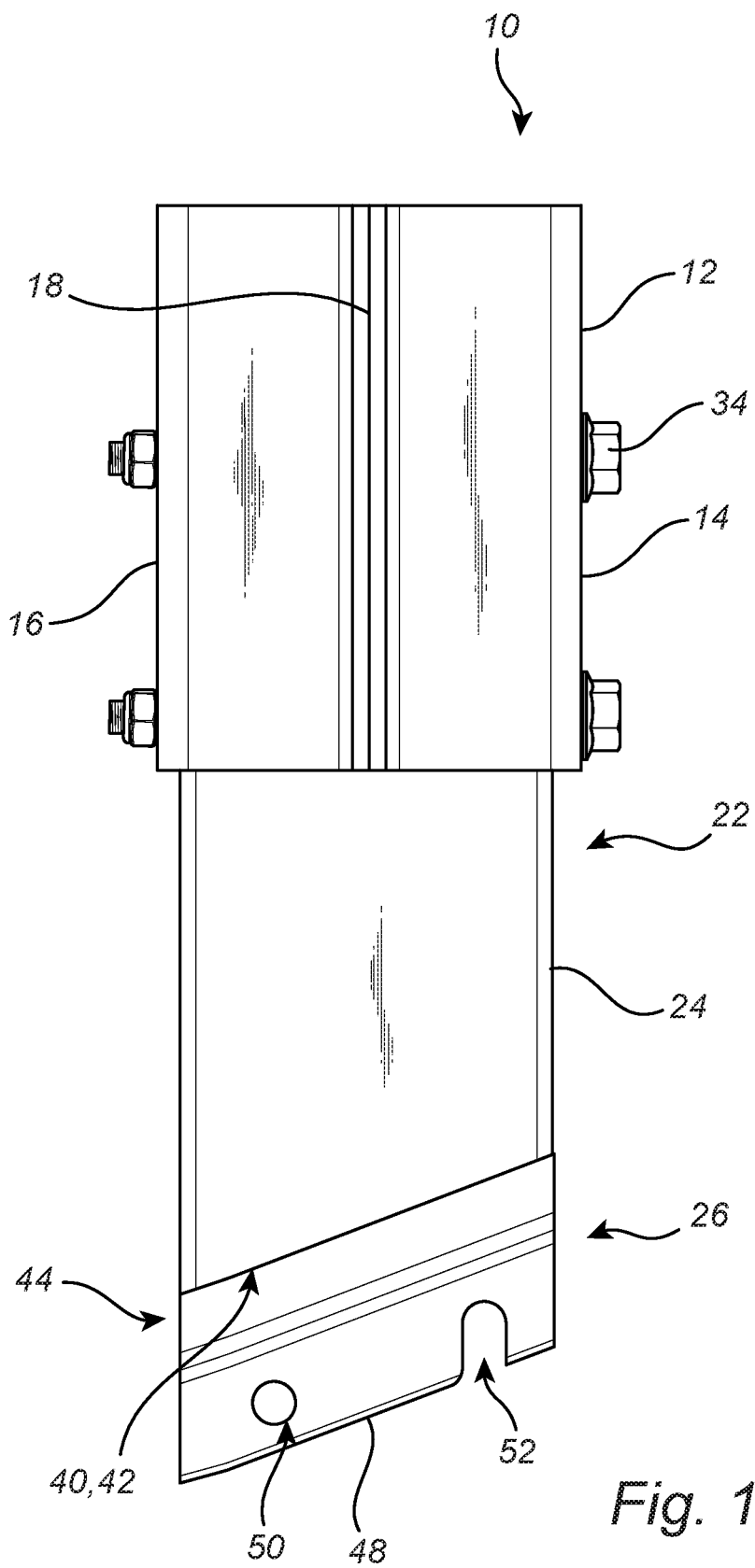
FIG. 1 is a planar view of one exemplary embodiment of the crush can and bumper beam mounting bracket assembly of the present disclosure coupled to an associated side rail.
Figure 2:
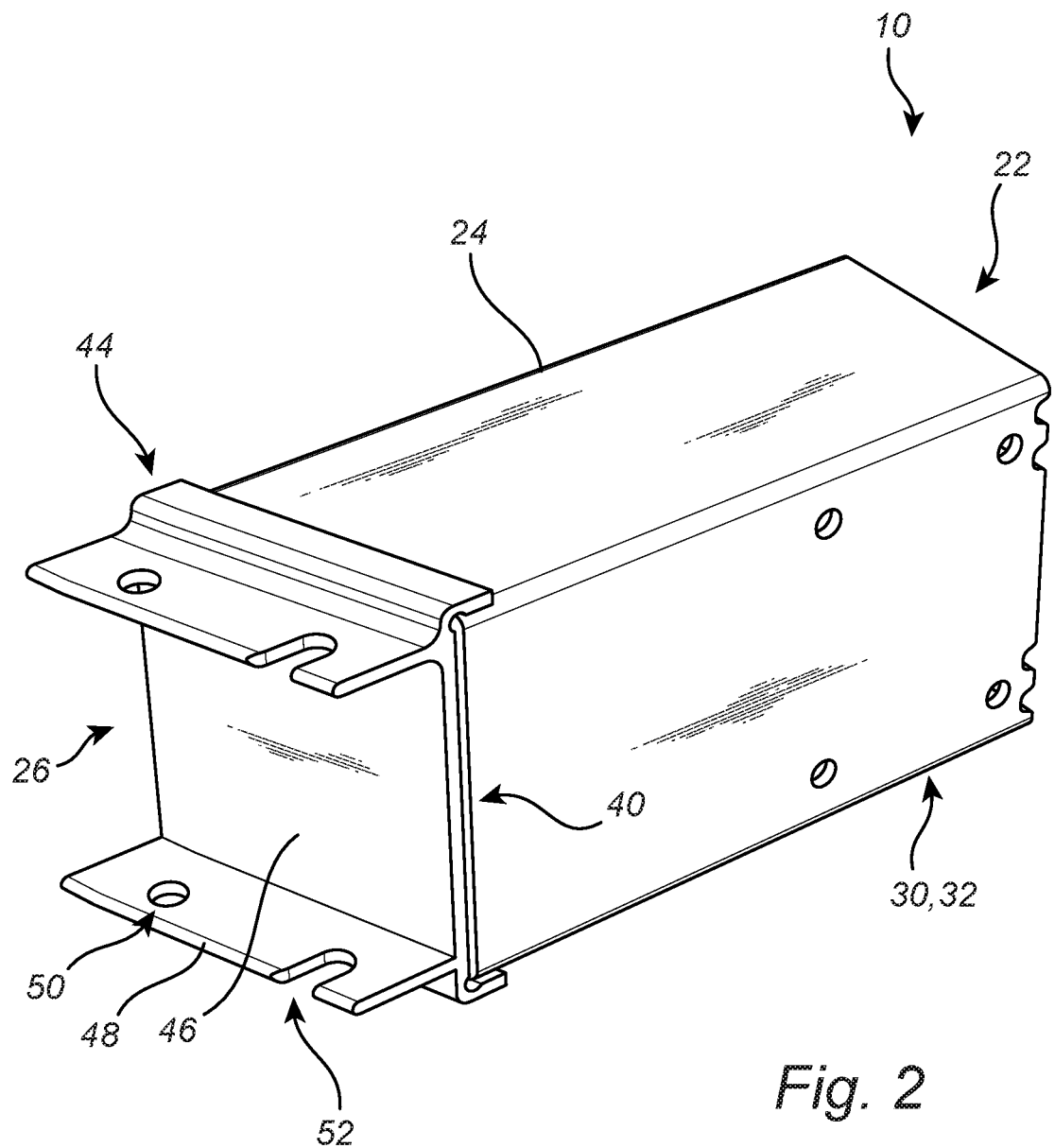
FIG. 2 is a perspective view of one exemplary embodiment of the crush can and bumper beam mounting bracket assembly of the present disclosure.
Figure 3:
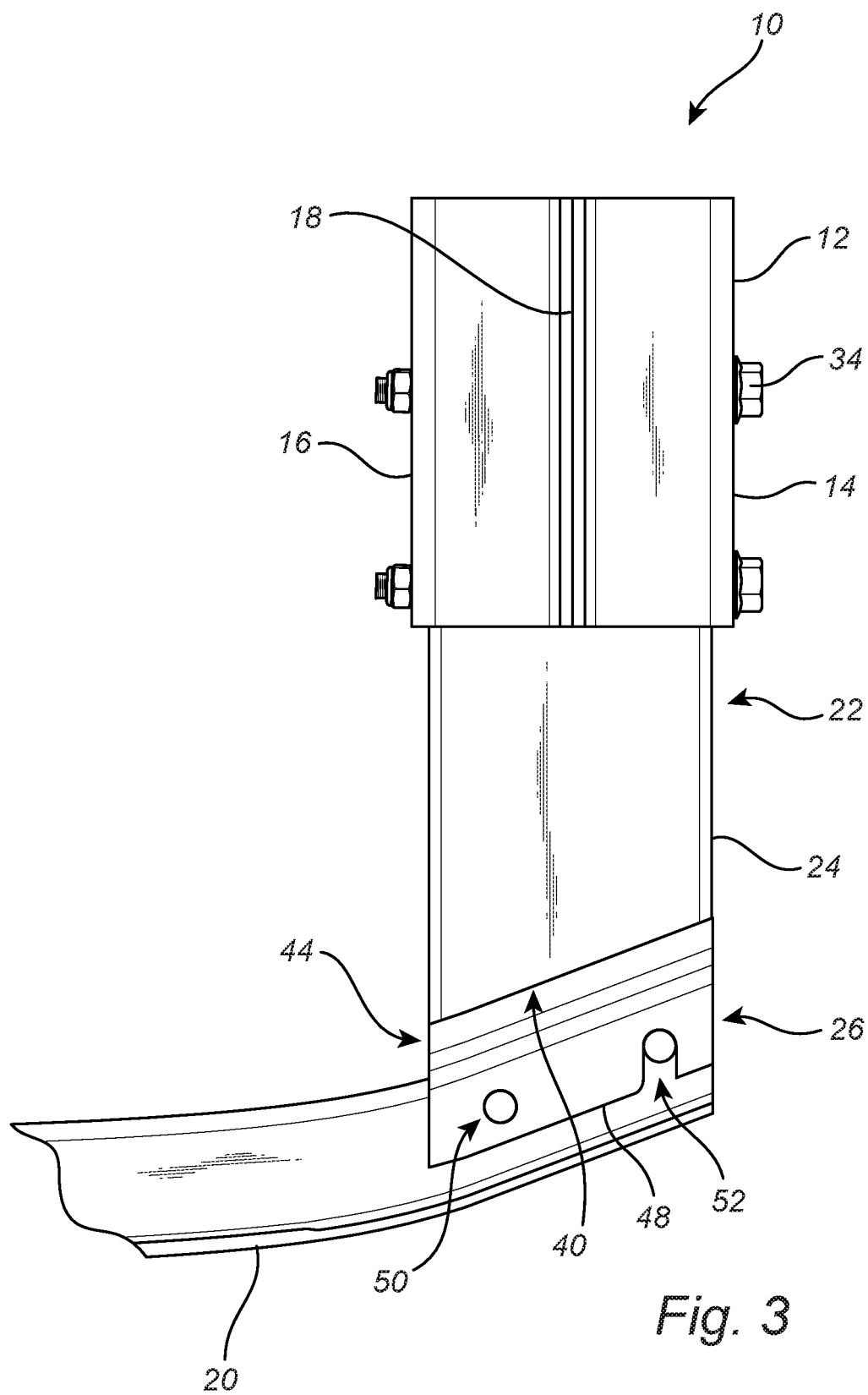
FIG. 3 is a planar view of one exemplary embodiment of the crush can and bumper beam mounting bracket assembly of the present disclosure coupled to and between an associated side rail and bumper beam.

Referring now specifically to FIGS. 1-3, in one exemplary embodiment, the bumper assembly 10 of the present disclosure is disposed at the front (or rear) end of a vehicle and includes a pair of longitudinally-disposed side rails 12 (and/or other longitudinally-disposed rails), well known to persons of ordinary skill in the art. Each of the pair of side rails 12 includes an outboard portion 14 and an inboard portion 16 that are bolted and/or welded or otherwise joined together to form a box-like, prismatic rail structure that defines an interior volume that is open on at least one end.

The outboard portion 14 and the inboard portion 16 of each side rail 12 are joined together along an upper and lower flange 18 in the exemplary embodiment illustrated. A laterally-disposed bumper beam 20, also well known to persons of ordinary skill in the art, is coupled to and between the pair of side rails 12 at the open ends thereof. This bumper beam 20 may consist of a single component or multiple components and provides the structural member to which a finished bumper on the exterior of the vehicle body is attached. It is this bumper beam 20 that is primarily (first) impacted during a front (or rear) or offset-deformable barrier (ODB) collision or the like. The side rails 12 and bumper beam 20 may be manufactured from extruded or stamped aluminum or another metallic material providing sufficient structural integrity while conserving weight to the extent possible.

A pair of crush cans (or crash boxes) 22 are disposed between the bumper beam 20 and the side rails 12, with one crush can 22 disposed on each side of the vehicle and associated with each side rail 12. Each of the pair of crush cans 22 includes a box structure 24 including a front portion and a rear portion and defining a longitudinal axis therethrough that is aligned with the longitudinal axis of the associated side rail 12. The front portion of the box structure 24 includes or is adapted to be coupled to a mounting bracket 26 that is adapted to be coupled to one end of the bumper beam 20 using bolts, for example, as is described in greater detail herein below. The rear portion of the box structure 24 is adapted to be disposed within the associated side rail 12, passing through the open end thereof and into the interior volume of the side rail 12. The rear portion of the box structure 24 defines a plurality of lateral holes 30. The plurality of lateral holes 30 of the rear portion of the box structure 24 are adapted to be aligned with a plurality of holes 32 defined by the outboard portion 14 and the inboard portion 16 of the associated side rail 12 when the rear portion of the box structure 24 is disposed within the side rail 12 and these holes 30,32 collectively receive a plurality of bolts 34 therethrough. This nesting configuration and these bolts 34 secure the crush can 22 in longitudinal alignment with the associated side rail 12, at a predetermined penetration depth, preventing relative movement of the crush can 22 with respect to the side rail 12, while providing a lightweight, assemble-able construct.

In the exemplary embodiment illustrated, upper and lower pairs of holes 30,32 and bolts 34 (as well as corresponding nuts) are used to secure the crush can 22 within and to the associated side rail 12. It will be readily apparent to those of ordinary skill in the art that other numbers and configurations of holes 30,32 and bolts 34 could be used equally.

Although not specifically illustrated, and not strictly required, one or more internal sleeves may be disposed within the interior of the box structure 24. The one or more internal sleeves define a plurality of lateral channels that are aligned with the plurality of lateral holes 30 of the rear portion of the box structure 24, and the plurality of lateral holes 30 of the rear portion of the box structure 24 and the plurality of lateral channels of the one or more internal sleeves are adapted to be aligned with the plurality of holes 32 defined by the outboard portion 14 and the inboard portion 16 of the associated side rail 12 when the rear portion of the box structure 24 is disposed within the side rail 12. These holes 30,32 and channels collectively receive the plurality of bolts 34 therethrough. Thus, the various channels individually or collectively surround the various bolts 34. This provides added structural integrity to the assembly 10. The crush cans 22 and internal sleeves may be manufactured from extruded or stamped aluminum or another metallic material providing sufficient structural integrity while again conserving weight to the extent possible.

Optionally, the one or more internal sleeves are thermally bonded to the opposed interior surfaces of the lateral walls of the associated box structure 24. Optionally, the one or more internal sleeves are friction-stir welded around their periphery/peripheries to the opposed interior surfaces of the lateral walls of the box structure 24. Again, this provides enhanced structural integrity. Again, the rear portion of each box structure 24, the associated one or more internal sleeves, and the outboard portion 14 and the inboard portion 16 of the associated side rail 12 define a pair of upper holes/channels and a pair of lower holes/channels. Optionally, each pair of upper channels is defined by a common upper internal sleeve and each pair of lower channels is defined by a common lower internal sleeve.

As illustrated, and a focus of the present disclosure, the front portion of each box structure 24 includes a front planar surface 40 to which the mounting bracket 26 is coupled. The front planar surface 40 is substantially laterally-oriented, but may be angled to conform to the desired taper angle of the attached portion of the bumper beam 20. The mounting bracket 26 is welded to the front planar surface 40 to provide a strong attachment, while minimizing stress concentration and crack propagation points/planes. As illustrated, welds 42, such as arc welds (AWs) or friction-stir welds (FSWs) may be provided along the side peripheries of the front planar surface 40 and the mounting bracket 26, as well as along the top and bottom peripheries of the front planar surface 40 and the mounting bracket 26. To make this coupling easier, the mounting bracket 26 may include one or more flanges 44 that protrude around the edges of the front portion of the box structure 24 and provide weld locations along the edges of the front portion of the box structure 24. These welds 42 provide linear load distribution paths along the front planar surface 40 of the box structure 24, thereby securing the mounting bracket 26 to the box structure 24, while again minimizing stress concentration and crack propagation points/planes.

The mounting bracket 26 generally includes a planar structure 46 that acts as the faceplate that is welded to the front planar surface 40 of the box structure 24. Upper and lower bracket members 48 are integrally formed with and protrude from the planar structure 46 and are disposed above and below the bumper beam 20, respectively, when all of the components are coupled together. As illustrated, these upper and lower bracket members 48 have a substantially parallel alignment. The planar structure 46 and upper and lower bracket members 48 may be manufactured from aluminum, steel, or another suitable strong and rigid material. The upper and lower bracket members 48 generally define corresponding holes 50 and slots 52 that are configured to receive a pair of bolts that pass through the intervening bumper beam 20, thereby securing the bumper beam 20 to the mounting bracket 26, box structure 24, and associated side rail 12. As illustrated, the holes 50 are disposed inboard of the slots 52 and impart the bumper beam 20 with a degree of rotation (about the holes 50) with respect to the mounting bracket 26, box structure 24, and associated side rail 12, such that the bumper beam 20 is not torqued and disconnected from the mounting bracket 26, box structure 24, and associated side rail 12 in the event of an ODB collision, for example, where rotational forces are experienced, often on a non-impacted end of the bumper beam 20. The mouth of the slots 52 may be widened to promote ease of bolt insertion. Further, since the bumper beam 20 is intended to rotate about the inner fixation point, it is desirable that the outer fixation point takes into account the circular path motion present. Thus, the slots 52 may be wider towards the center of the vehicle to make it easier for the bolts to slide out without excessive resistance.

By way of helpful background, the effect of an ODB impact on the bumper beam 20 and associated structures is complex. When an object strikes one end of the bumper beam 20, that end is driven into the vehicle until the object comes to its resting position, crushing the crush can 22 and side rail 12 on that side of the vehicle longitudinally into the vehicle. This effectively provides a pulling force and a torque on the other end of the bumper beam 20 through the bumper beam 20. The crush can 22 at the other end of the bumper beam 20 is thereby pulled longitudinally forward with respect to the associated side rail 12, potentially tearing this crush can 22 from this side rail 12, but for the mechanisms of the present disclosure. Here, welds that secure the internal sleeves within the crush cans 22 are provided, along with the allowance for a degree of rotation between the bumper beam 20 and the mounting bracket 26. Preventing rotational and longitudinal detachment of the crush can 22 from the associated side rail 12 here limits disengagement of vehicle components, maintains as much vehicle structural integrity as possible, and limits the potential for vehicle occupant and third party injury. In other words, crash worthiness is significantly enhanced.

Again, although not a focus of the present disclosure, a pair of internal sleeves, each encompassing an adjacent pair of channels, upper and lower, are disposed and secured within the associated crush can 22. Each of the channels is formed by a cylindrical bore structure that traverses the interior of the crush can 22 laterally. Adjacent cylindrical bore structures are joined via one or more spanning members, although other suitable configurations can be utilized equally. Again, the crush cans 22 and internal sleeves may be manufactured from extruded or stamped aluminum or another metallic material providing sufficient structural integrity while conserving weight to the extent possible. End welds are used to secure the internal sleeves within the associated crush can. Arc welding in aluminum has several drawbacks in this context. First, it provides a zonal connection and its mechanical performance is heavily influenced by e.g. penetration depth and general adhesion characteristics to a base material. These parameters tend to require significant tuning and service during production to maintain quality. As a consequence, virtual verification of the product in a computer-aided engineering (CAE) environment is complex. Second, a base material is affected by the heat input from the process, lowering its mechanical performance, and subsequent heat treatment is typically needed bring the properties up again, for both the base material and the weld. FSW, on the other hand, provides the desired structural integrity alone and immediately. The channels are configured to receive the aforementioned bolts 34 (and nuts) that secure the crush can 22 to the associated side rail 12 after the rear portion of the crush can 22 is inserted into the open end of the side rail 12. It is also contemplated that the crush cans 22 could be disposed outside of and about the end portions of the side rails 12, if so desired.

When utilizing adjacent pairs of upper and lower holes 30, for each internal sleeve, the FSW is started at the front-upper portion of the internal sleeve periphery, adjacent to the front hole 30. The FSW proceeds to the rear-upper portion of the internal sleeve periphery, adjacent to the rear hole 30, and ends there. The FSW is then started at the rear-lower portion of the internal sleeve periphery, adjacent to the rear hole 30. The FSW proceeds to the front-lower portion of the internal sleeve periphery, adjacent to the front hole 30, and ends there. The circular motion utilized in this exemplary embodiment minimizes tool adjustment and realignment motion, thereby reducing process time and cost.

In the event of an ODB collision, the crush can 22 on the non-struck side of the vehicle experiences a pull-out force due to the rotational forces created in the front of the vehicle. This creates a reactionary force along the FSWs. This occurs after the pull-out force is high enough to overcome the bolt clamp force holding the crush can 22 and the side rail 12 together, when slippage occurs. This slippage occurs suddenly and is very brief, and stops when the bolt 34 contacts the internal sleeve. When this happens, the pull-out force is distributed along the FSW. Thus, the loads experienced are transferred from the side rail 12, through the bolts 34, and onto the larger portion of the lateral walls of the crush can 22 via the internal sleeves, and vice versa.

Alternatively, when utilizing adjacent pairs of upper and lower holes 30, for each internal sleeve, the FSW is started at the rear-upper portion of the internal sleeve periphery, adjacent to the rear hole 30. The FSW proceeds around the front hole 30 to the rear-lower portion of the internal sleeve periphery, adjacent to the rear hole 30, and ends there. Thus, by careful design, this configuration eliminates the otherwise common weak points that arise in start and end points when utilizing traditional thermal bonding techniques. Arc welding produces an uneven weld cross section in starts and finishes, and in similar fashion FSW will produce a tooling indentations. Consequently, one is potentially left with a largely non-homogenous connection with obvious trigger points in starts and finishes, thereby compromising the structural integrity. The present disclosure arranges process start and finish points in such a manner that they are not included in the finished product, essentially, hence are not able to act as triggers, and consequently adding performance and achieving the overall goal of decreasing the risk of disconnected crush cans and side rails. This is accomplished by placing FSW start and end points in the rearmost portion of each crush can. Via CNC machining, the start and end points can essentially be removed from the loaded structure, leaving only a homogenous thermal connection.

Figure 4:
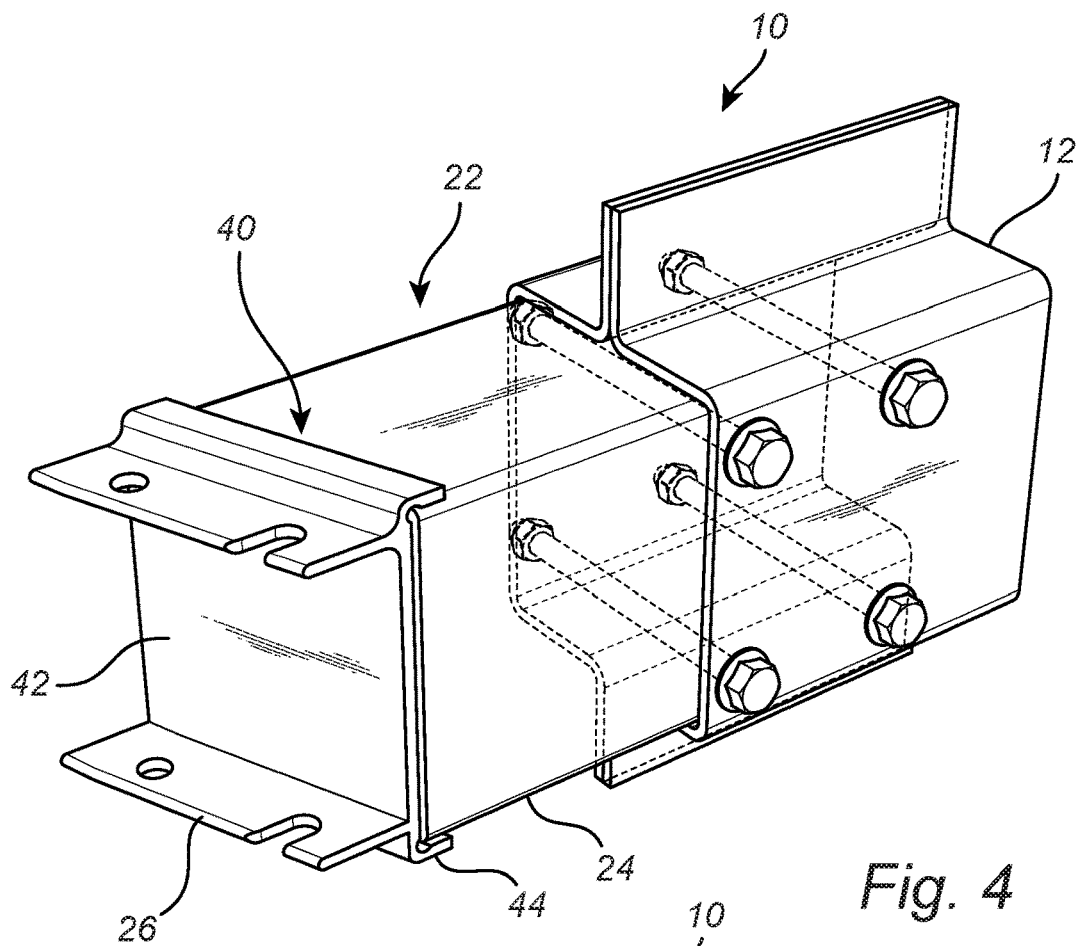
FIG. 4 is a perspective view of one exemplary embodiment of the crush can and bumper beam mounting bracket assembly of the present disclosure coupled to an associated side rail and highlighting the attachment of the mounting bracket to the front portion of the crush can.
Figure 5:
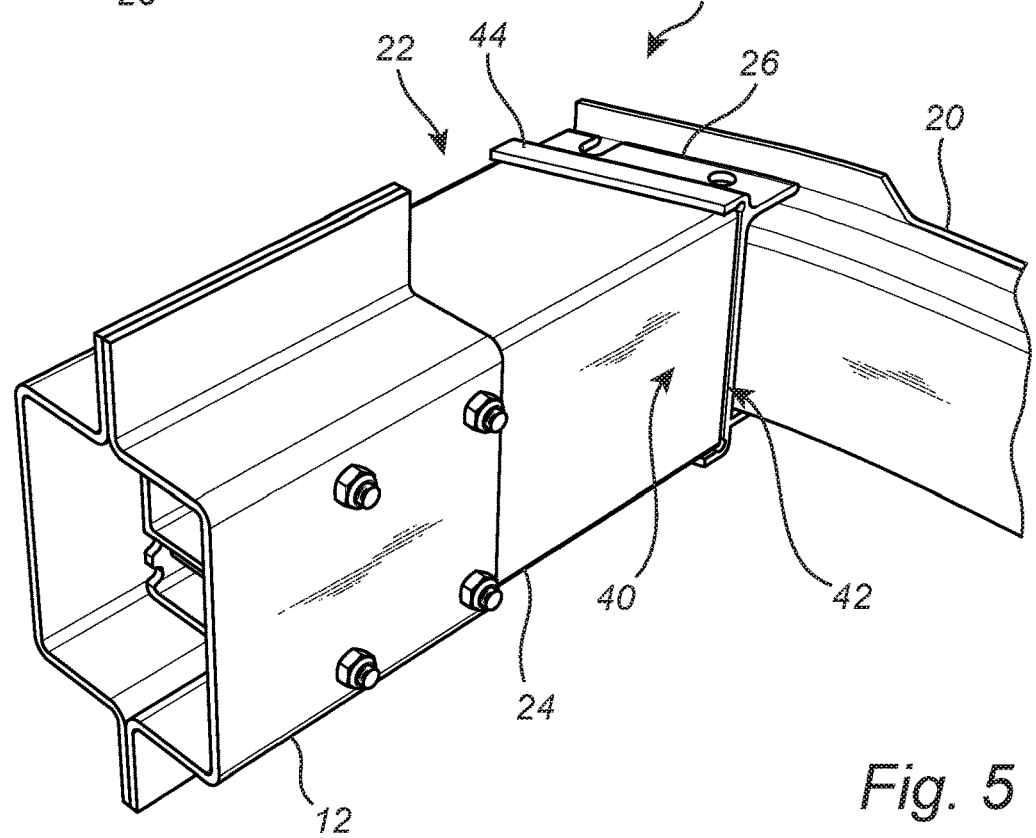
FIG. 5 is a perspective view of one exemplary embodiment of the crush can and bumper beam mounting bracket assembly of the present disclosure coupled to an associated side rail and bumper beam and highlighting the attachment of the mounting bracket to the front portion of the crush can.

Referring now specifically to FIGS. 4 and 5, the mounting bracket 26 is welded to the front planar surface 40 to provide a strong attachment, while minimizing stress concentration and crack propagation points/planes. As illustrated, welds 42, such as AWs or FSWs may be provided along the side peripheries of the front planar surface 40 and the mounting bracket 26, as well as along the top and bottom peripheries of the front planar surface 40 and the mounting bracket 26. To make this coupling easier, the mounting bracket 26 may include one or more flanges 44 that protrude around the edges of the front portion of the box structure 24 and provide weld locations along the edges of the front portion of the box structure 24. These welds 42 provide linear load distribution paths along the front planar surface 40 of the box structure 24, thereby securing the mounting bracket 26 to the box structure 24, while again minimizing stress concentration and crack propagation points/planes.

Figure 6:
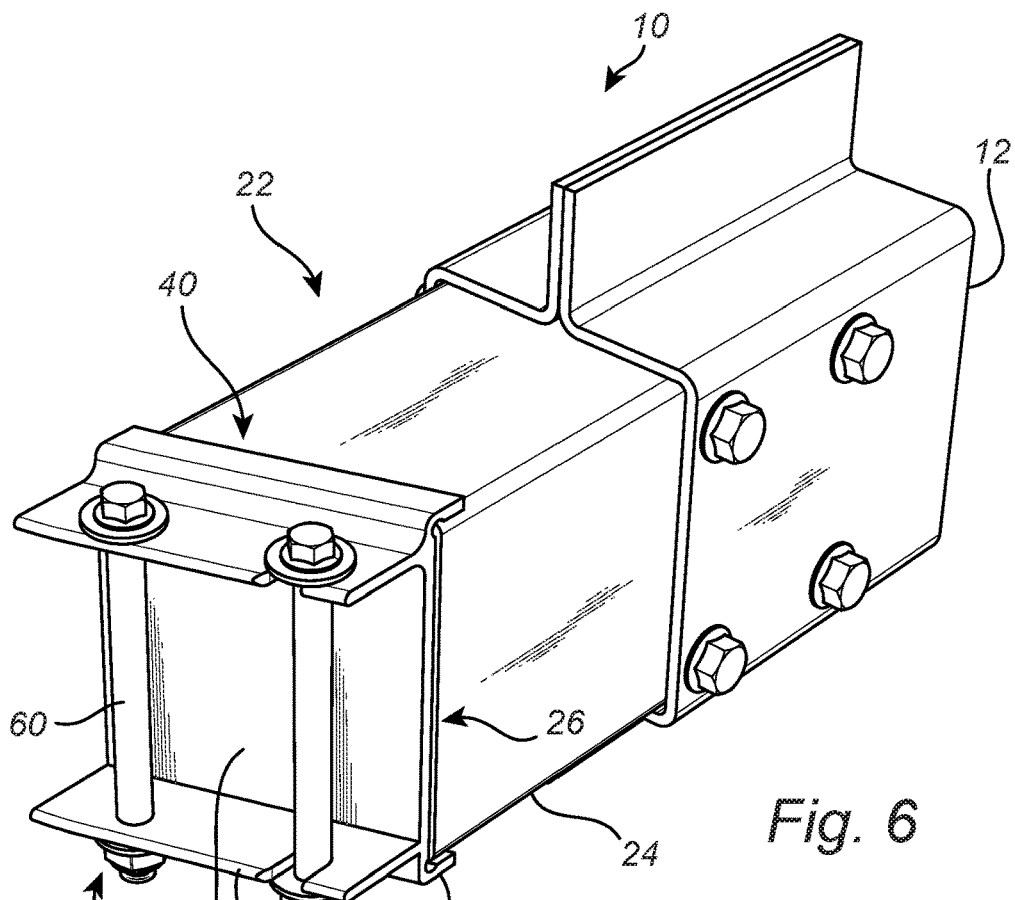
FIG. 6 is a perspective view of one exemplary embodiment of the crush can and bumper beam mounting bracket assembly of the present disclosure coupled to an associated side rail and highlighting the bumper beam bolt-retaining holes/slots of the mounting bracket.

Referring now specifically to FIG. 6, the mounting bracket 26 generally includes the planar structure 46 that acts as the faceplate that is welded to the front planar surface 40 of the box structure 24. The upper and lower bracket members 48 are integrally formed with and protrude from the planar structure 46 and are disposed above and below the bumper beam 20, respectively, when all of the components are coupled together. As illustrated, these upper and lower bracket members 48 have a substantially parallel alignment. The planar structure 46 and upper and lower bracket members 48 may be manufactured from aluminum, steel, or another suitable strong and rigid material. The upper and lower bracket members 48 generally define the corresponding holes 50 and slots 52 that are configured to receive the pair of bolts 60 that pass through the intervening bumper beam 20, thereby securing the bumper beam 20 to the mounting bracket 26, box structure 24, and associated side rail 12. As illustrated, the holes 50 are disposed inboard of the slots 52 and impart the bumper beam 20 with a degree of rotation (about the holes 50) with respect to the mounting bracket 26, box structure 24, and associated side rail 12, such that the bumper beam 20 is not torqued and disconnected from the mounting bracket 26, box structure 24, and associated side rail 12 in the event of an ODB collision, for example, where rotational forces are experienced, often on a non-impacted end of the bumper beam 20. The mouth of the slots 52 may again be widened to promote ease of bolt insertion.

Figure 7:
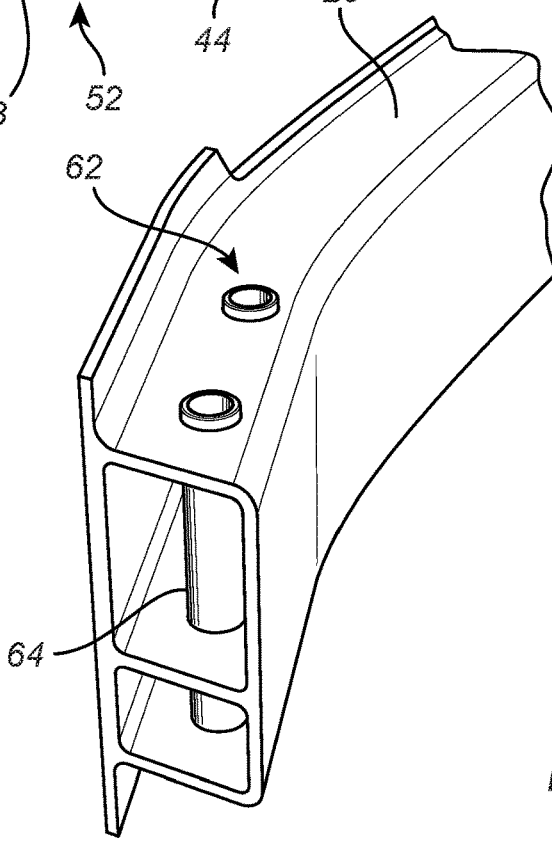
FIG. 7 is a perspective view of one exemplary embodiment of the bumper beam of the present disclosure highlighting the associated bolt-retaining sleeves.

As illustrated in FIG. 7, in one exemplary embodiment, the bumper beam 20 defines a pair of vertical channels 62, formed by a pair of internal sleeves 64, through which the associated pair of bolts 60 pass to couple the bumper beam 20 to the associated mounting bracket 26. In this exemplary embodiment, the pair of vertical channels 62 is disposed near the end of the bumper beam 20 to correspond to the location of the associated crush can 22 and side rail 12, and the bumper beam is manufactured from extruded/stamped aluminum or the like.

Figure 8:
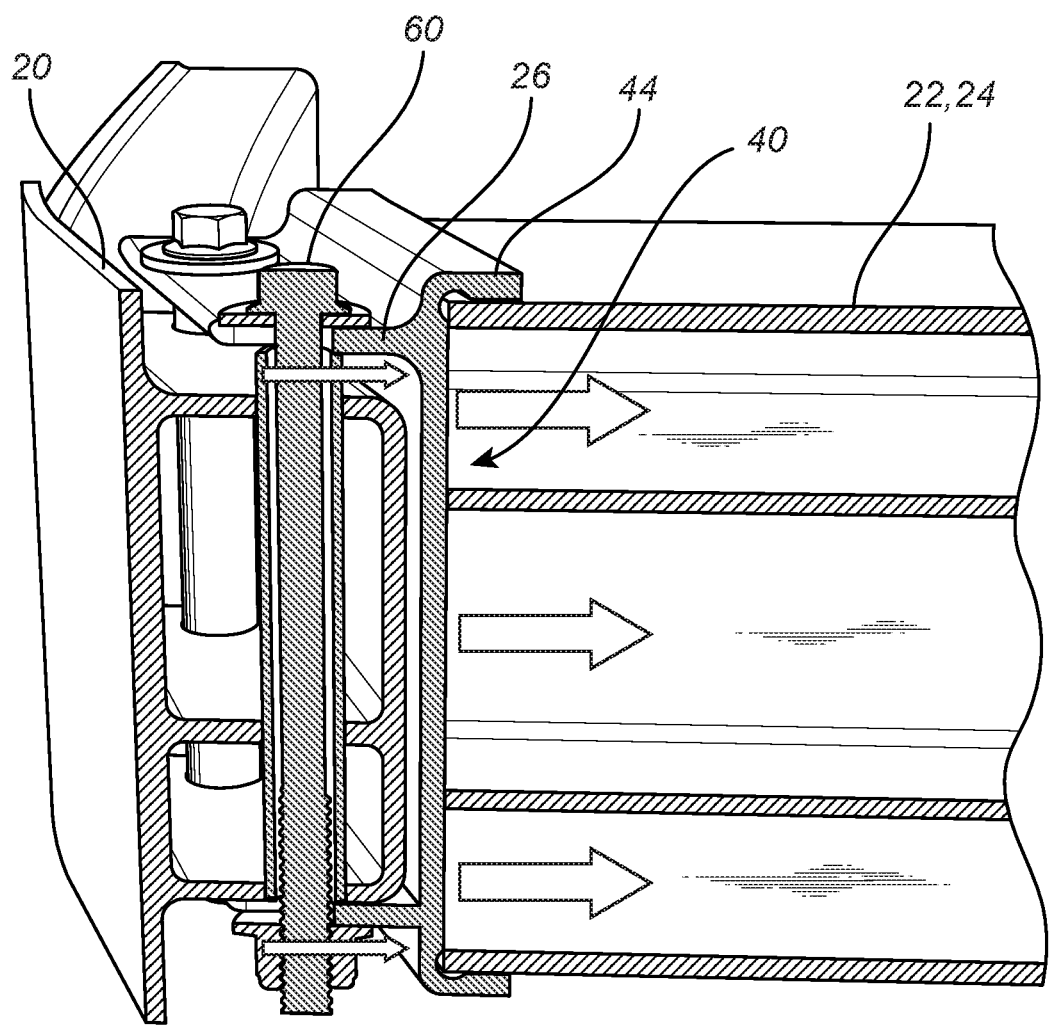
FIG. 8 is a cross-sectional view of one exemplary embodiment of the crush can and bumper beam mounting bracket assembly of the present disclosure coupled to and between an associated side rail and bumper beam and highlighting the collision loads distributed between the various components.

FIG. 8 illustrates the transfer of longitudinal loads from the bumper beam 20 through, the bolts 60 and associated mounting bracket 26 and flanges 44, into the front planar surface 40 of the box structure 24, and into the associated crush can 22 (with the aforementioned degree of rotational movement being contemplated), or vice versa. The surfaces and junctions utilized provide no significant points or planes for stress concentration or crack propagation. Thus, this collective structure is strong and typically remains intact and structurally sound in the event of a collision, with the components resisting being ripped apart.

Figure 9:
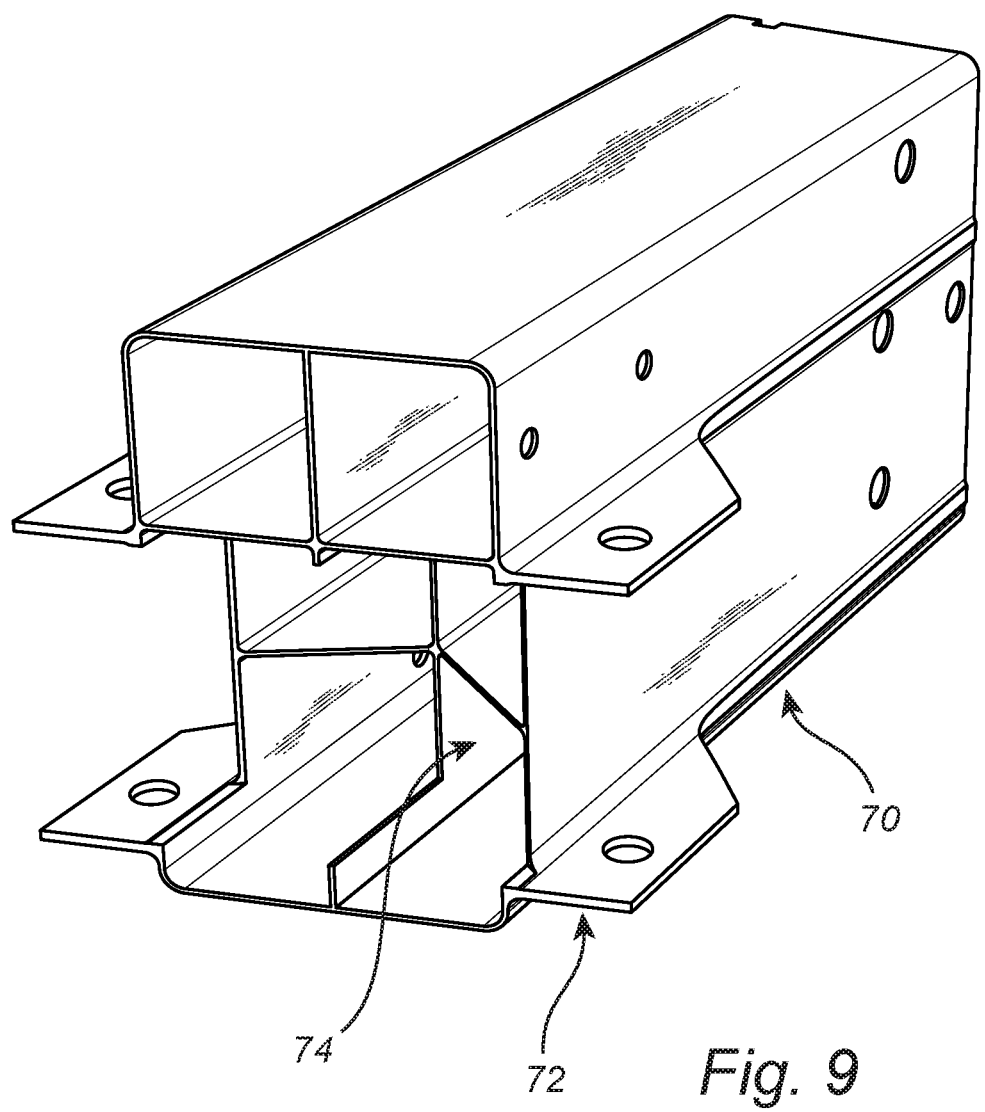
FIG. 9 is a perspective view of a conventional crush can utilizing a bumper beam cutout and associated mounting flanges that create stress concentration and crack initiation points/planes at a front portion thereof.

FIG. 9 illustrates a conventional crush can-bumper beam interface, in which the crush can 70 includes a laterally-disposed mounting assembly 72 and cutout 74 that are collectively adapted to receive and retain the associated bumper beam. This laterally-disposed mounting assembly 72 and cutout 74 provide numerous significant points or planes for stress concentration or crack propagation, as a longitudinal flow of forces is not maintained in many circumstances.

Thus, in one exemplary embodiment, the present disclosure provides a crush can assembly adapted to couple a bumper beam assembly to a side rail of a vehicle, the crush can assembly including: a box structure including a front portion and a rear portion, wherein the rear portion of the box structure is adapted to be coupled to the side rail; and a mounting bracket coupled to the front portion of the box structure, wherein the mounting bracket is adapted to be coupled to the bumper beam assembly. The rear portion of the box structure is adapted to be one or more of disposed within and bolted to the side rail. The mounting bracket is welded to a front edge of the front portion of the box structure. Optionally, the mounting bracket is welded to a side edge of the front portion of the box structure. The mounting bracket includes one or more flanges that are each welded to the side edge of the front portion of the box structure. The mounting bracket includes a planar structure that is coupled to the front portion of the box structure and one or more bracket members that protrude substantially perpendicularly from the planar structure, wherein each of the one or more bracket members is adapted to be coupled to the bumper beam assembly. Each of the one or more bracket members defines a hole adapted to receive a first bolt that is disposed through the bumper beam assembly and a slot adapted to receive a second bolt that is disposed through the bumper beam assembly. Optionally, the slot is disposed inboard of the associated hole. The first bolt is disposed through a first sleeve coupled to and through the bumper beam assembly and the second bolt is disposed through a second sleeve coupled to and through the bumper beam assembly.

In another exemplary embodiment, the present disclosure provides a bumper assembly for a vehicle, the bumper assembly including: a side rail; a bumper beam assembly coupled to the side rail; and a crush can assembly adapted to couple the bumper beam assembly to the side rail, the crush can assembly including: a box structure including a front portion and a rear portion, wherein the rear portion of the box structure is adapted to be coupled to the side rail; and a mounting bracket coupled to the front portion of the box structure, wherein the mounting bracket is adapted to be coupled to the bumper beam assembly. The rear portion of the box structure is adapted to be one or more of disposed within and bolted to the side rail. The mounting bracket is welded to a front edge of the front portion of the box structure. Optionally, the mounting bracket is welded to a side edge of the front portion of the box structure. The mounting bracket includes one or more flanges that are each welded to the side edge of the front portion of the box structure. The mounting bracket includes a planar structure that is coupled to the front portion of the box structure and one or more bracket members that protrude substantially perpendicularly from the planar structure, wherein each of the one or more bracket members is adapted to be coupled to the bumper beam assembly. Each of the one or more bracket members defines a hole adapted to receive a first bolt that is disposed through the bumper beam assembly and a slot adapted to receive a second bolt that is disposed through the bumper beam assembly. Optionally, the slot is disposed inboard of the associated hole. The first bolt is disposed through a first sleeve coupled to and through the bumper beam assembly and the second bolt is disposed through a second sleeve coupled to and through the bumper beam assembly.

In a further exemplary embodiment, the present disclosure provides a vehicle utilizing a bumper assembly including: a side rail; a bumper beam assembly coupled to the side rail; and a crush can assembly adapted to couple the bumper beam assembly to the side rail, the crush can assembly including: a box structure including a front portion and a rear portion, wherein the rear portion of the box structure is adapted to be coupled to the side rail; and a mounting bracket coupled to the front portion of the box structure, wherein the mounting bracket is adapted to be coupled to the bumper beam assembly. The rear portion of the box structure is adapted to be one or more of disposed within and bolted to the side rail. The mounting bracket is welded to a front edge of the front portion of the box structure. Optionally, the mounting bracket is welded to a side edge of the front portion of the box structure. The mounting bracket includes one or more flanges that are each welded to the side edge of the front portion of the box structure. The mounting bracket includes a planar structure that is coupled to the front portion of the box structure and one or more bracket members that protrude substantially perpendicularly from the planar structure, wherein each of the one or more bracket members is adapted to be coupled to the bumper beam assembly. Each of the one or more bracket members defines a hole adapted to receive a first bolt that is disposed through the bumper beam assembly and a slot adapted to receive a second bolt that is disposed through the bumper beam assembly. Optionally, the slot is disposed inboard of the associated hole. The first bolt is disposed through a first sleeve coupled to and through the bumper beam assembly and the second bolt is disposed through a second sleeve coupled to and through the bumper beam assembly.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A crush can assembly adapted to couple a bumper beam assembly to a side rail of a vehicle, the crush can assembly comprising:
   a box structure comprising a front portion and a rear portion, wherein the rear portion of the box structure is adapted to be coupled to the side rail; and
   a mounting bracket coupled to the front portion of the box structure, wherein the mounting bracket is adapted to be coupled to the bumper beam assembly.

2. The crush can assembly of claim 1, wherein the rear portion of the box structure is adapted to be one or more of disposed within and bolted to the side rail.

3. The crush can assembly of claim 1, wherein the mounting bracket is welded to a front edge of the front portion of the box structure.

4. The crush can assembly of claim 1, wherein the mounting bracket is welded to a side edge of the front portion of the box structure.

5. The crush can assembly of claim 4, wherein the mounting bracket comprises one or more flanges that are each welded to the side edge of the front portion of the box structure.

6. The crush can assembly of claim 1, wherein the mounting bracket comprises a planar structure that is coupled to the front portion of the box structure and one or more bracket members that protrude substantially perpendicularly from the planar structure, wherein each of the one or more bracket members is adapted to be coupled to the bumper beam assembly.

7. The crush can assembly of claim 1, wherein each of the one or more bracket members defines a hole adapted to receive a first bolt that is disposed through the bumper beam assembly and a slot adapted to receive a second bolt that is disposed through the bumper beam assembly.

8. The crush can assembly of claim 7, wherein the slot is disposed outboard of the associated hole.

9. The crush can assembly of claim 7, wherein the first bolt is disposed through a first sleeve coupled to and through the bumper beam assembly and the second bolt is disposed through a second sleeve coupled to and through the bumper beam assembly.

10. A bumper assembly adapted to be coupled to a side rail of a vehicle, the bumper assembly comprising:
    a bumper beam assembly adapted to be coupled to the side rail; and
    a crush can assembly adapted to couple the bumper beam assembly to the side rail, the crush can assembly comprising:
      a box structure comprising a front portion and a rear portion, wherein the rear portion of the box structure is adapted to be coupled to the side rail; and
      a mounting bracket coupled to the front portion of the box structure, wherein the mounting bracket is adapted to be coupled to the bumper beam assembly.

11. The bumper assembly of claim 10, wherein the rear portion of the box structure is adapted to be one or more of disposed within and bolted to the side rail.

12. The bumper assembly of claim 10, wherein the mounting bracket is welded to a front edge of the front portion of the box structure.

13. The bumper assembly of claim 10, wherein the mounting bracket is welded to a side edge of the front portion of the box structure.

14. The bumper assembly of claim 13, wherein the mounting bracket comprises one or more flanges that are each welded to the side edge of the front portion of the box structure.

15. The bumper assembly of claim 10, wherein the mounting bracket comprises a planar structure that is coupled to the front portion of the box structure and one or more bracket members that protrude substantially perpendicularly from the planar structure, wherein each of the one or more bracket members is adapted to be coupled to the bumper beam assembly.

16. The bumper assembly of claim 10, wherein each of the one or more bracket members defines a hole adapted to receive a first bolt that is disposed through the bumper beam assembly and a slot adapted to receive a second bolt that is disposed through the bumper beam assembly.

17. The bumper assembly of claim 16, wherein the slot is disposed outboard of the associated hole.

18. The bumper assembly of claim 16, wherein the first bolt is disposed through a first sleeve coupled to and through the bumper beam assembly and the second bolt is disposed through a second sleeve coupled to and through the bumper beam assembly.

* * * * *